United States Patent
Levi et al.

(10) Patent No.: US 8,438,055 B2
(45) Date of Patent: *May 7, 2013

(54) SYSTEM AND METHOD FOR PROVIDING ENDORSED ADVERTISEMENTS AND TESTIMONIALS BETWEEN COMMUNICATION DEVICES

(75) Inventors: Andrew E. Levi, Plano, TX (US); Bradley W. Bauer, Richardson, TX (US)

(73) Assignee: Blue Calypso, LLC, Dallas, TX (US)

( * ) Notice: Subject to any disclaimer, the term of this patent is extended or adjusted under 35 U.S.C. 154(b) by 344 days.

This patent is subject to a terminal disclaimer.

(21) Appl. No.: 12/803,635

(22) Filed: Jul. 1, 2010

(65) Prior Publication Data
US 2012/0004971 A1      Jan. 5, 2012

(51) Int. Cl.
*G06Q 30/00* (2012.01)
(52) U.S. Cl.
USPC .............................................. 705/14
(58) Field of Classification Search ............ 705/14
See application file for complete search history.

(56) References Cited

U.S. PATENT DOCUMENTS

| | | |
|---|---|---|
| 4,850,007 A | 7/1989 | Marino et al. |
| 5,333,186 A | 7/1994 | Gupta |
| 5,448,625 A | 9/1995 | Lederman |
| 5,852,775 A | 12/1998 | Hidary |
| 5,937,037 A | 8/1999 | Kamel et al. |
| 6,009,150 A | 12/1999 | Kamel |
| 6,084,628 A | 7/2000 | Sawyer |
| 6,181,927 B1 | 1/2001 | Welling, Jr. et al. |
| 6,324,519 B1 | 11/2001 | Eldering |
| 6,442,529 B1 | 8/2002 | Krishan et al. |
| 6,493,437 B1 | 12/2002 | Olshansky |
| 6,647,257 B2 | 11/2003 | Owensby |
| 7,184,972 B2 | 2/2007 | Flaherty |
| 7,197,544 B2 | 3/2007 | Wang et al. |
| 7,240,843 B2 | 7/2007 | Paul |
| 7,389,118 B2 | 6/2008 | Vesikivi et al. |
| 7,599,852 B2 | 10/2009 | Bosarge et al. |
| 2001/0047294 A1 | 11/2001 | Rothschild |
| 2002/0071076 A1 | 6/2002 | Webb |
| 2002/0072967 A1 | 6/2002 | Jacobs et al. |
| 2002/0077988 A1 | 6/2002 | Sasaki et al. |

(Continued)

FOREIGN PATENT DOCUMENTS

| | | |
|---|---|---|
| JP | 2001/256388 A | 9/2001 |
| JP | 2007/219840 A | 8/2007 |

(Continued)

OTHER PUBLICATIONS

Gao, J Kulkarni, V Ranavat, H Lee Chang Hsing Mei; A 2D Barcode-Based Mobile Payment System; Multimedia and Ubiquitous Engineering, 2009. MUE '09; Jun. 4-6, 2009; pp. 320-329.

(Continued)

*Primary Examiner* — Saba Dagnew
(74) *Attorney, Agent, or Firm* — Schultz & Associates, P.C.

(57) ABSTRACT

A system and method are disclosed for distribution of advertisements between communication devices. The system and method provides for accounting and distribution of incentives related to distribution of the advertisements. The system further provides for association of testimonials from advertising recipients related to the advertisement and for distribution of the testimonials to communication devices. A bi-directional selection between subscribers and advertisers using the system is created whereby both advertisers and subscribers agree to participate in the distribution of advertisements and testimonials.

14 Claims, 12 Drawing Sheets

Automatic Subscriber Enrollment Process

U.S. PATENT DOCUMENTS

| | | |
|---|---|---|
| 2002/0091569 A1 | 7/2002 | Kitaura |
| 2002/0094868 A1 | 7/2002 | Tuck et al. |
| 2002/0160761 A1 | 10/2002 | Wolfe |
| 2002/0198777 A1 | 12/2002 | Yuasa |
| 2003/0032409 A1 | 2/2003 | Hutcheson et al. |
| 2003/0144035 A1 | 7/2003 | Weinblatt |
| 2003/0158776 A1 | 8/2003 | Landesmann |
| 2003/0172376 A1 | 9/2003 | Coffin, III |
| 2003/0177347 A1 | 9/2003 | Schneier |
| 2003/0233276 A1 | 12/2003 | Pearlman |
| 2004/0103023 A1 | 5/2004 | Irwin |
| 2004/0148424 A1 | 7/2004 | Berkson et al. |
| 2004/0177003 A1 | 9/2004 | Liao |
| 2005/0044483 A1 | 2/2005 | Maze et al. |
| 2005/0055409 A1 | 3/2005 | Alsarraf et al. |
| 2006/0041469 A1 | 2/2006 | Mathis |
| 2006/0041477 A1 | 2/2006 | Zheng |
| 2006/0080111 A1 | 4/2006 | Homeier Beals |
| 2006/0111967 A1 | 5/2006 | Forbes |
| 2007/0016921 A1 | 1/2007 | Levi et al. |
| 2007/0192182 A1 | 8/2007 | Monaco |
| 2007/0203792 A1 | 8/2007 | Rao |
| 2007/0241189 A1 | 10/2007 | Slavin |
| 2007/0244750 A1 | 10/2007 | Grannan et al. |
| 2007/0271139 A1 | 11/2007 | Fiorini |
| 2007/0281692 A1 | 12/2007 | Bucher |
| 2007/0290031 A1 | 12/2007 | Singh |
| 2008/0133366 A1 | 6/2008 | Evans |
| 2008/0133678 A1 | 6/2008 | Woodham et al. |
| 2008/0172285 A1 | 7/2008 | Hurowitz |
| 2008/0183587 A1 | 7/2008 | Joo et al. |
| 2008/0263584 A1 | 10/2008 | Salo et al. |
| 2008/0287150 A1 | 11/2008 | Jiang et al. |
| 2009/0030774 A1 | 1/2009 | Rothschild et al. |
| 2009/0099929 A1 | 4/2009 | Thibedeau |
| 2009/0106368 A1 | 4/2009 | Padveen et al. |
| 2009/0204901 A1 | 8/2009 | Dharmaji et al. |
| 2009/0287574 A1 | 11/2009 | Kane |

FOREIGN PATENT DOCUMENTS

| | | |
|---|---|---|
| KR | 2006/028602 A | 3/2006 |
| WO | WO96/24213 A1 | 8/1996 |
| WO | WO00/41121 A1 | 7/2000 |
| WO | 01/11472 | 2/2001 |
| WO | WO01/16853 A1 | 3/2001 |
| WO | WO2007/139348 A1 | 12/2007 |
| WO | WO2009/148338 A2 | 12/2009 |

OTHER PUBLICATIONS

Aigner, Manfred Dominikus, Sandra Feldhofer, Martin; A System of Secure Virtual Coupons Using NFC Technology; PerCom Workshops '07. Mar. 19-23, 2007; pp. 362-366.

Gao, Jagatesan; Understanding 2D-BarCode Tech and Appls in M-Commerce-Design and Implementation of a 2D Barcode Processing Solution; COMPSAC 2007; Jul. 24-27, 2007; pp. 49-56.

Kato, H. Tan, K.T.; 2D barcodes for mobile phones; Mobile Technology, Applications and Systems, 2005 2nd International Conference on; Nov. 15-17, 2005; p. 8.

Koung-Lung Lin Hsu, J.Y.-J. Han-Shen Huang Chun-Nan Hsu; A recommender for targeted advertisement of unsought products in e-commerce; CEC 2005; Jul. 19-22, 2005; pp. 101-108.

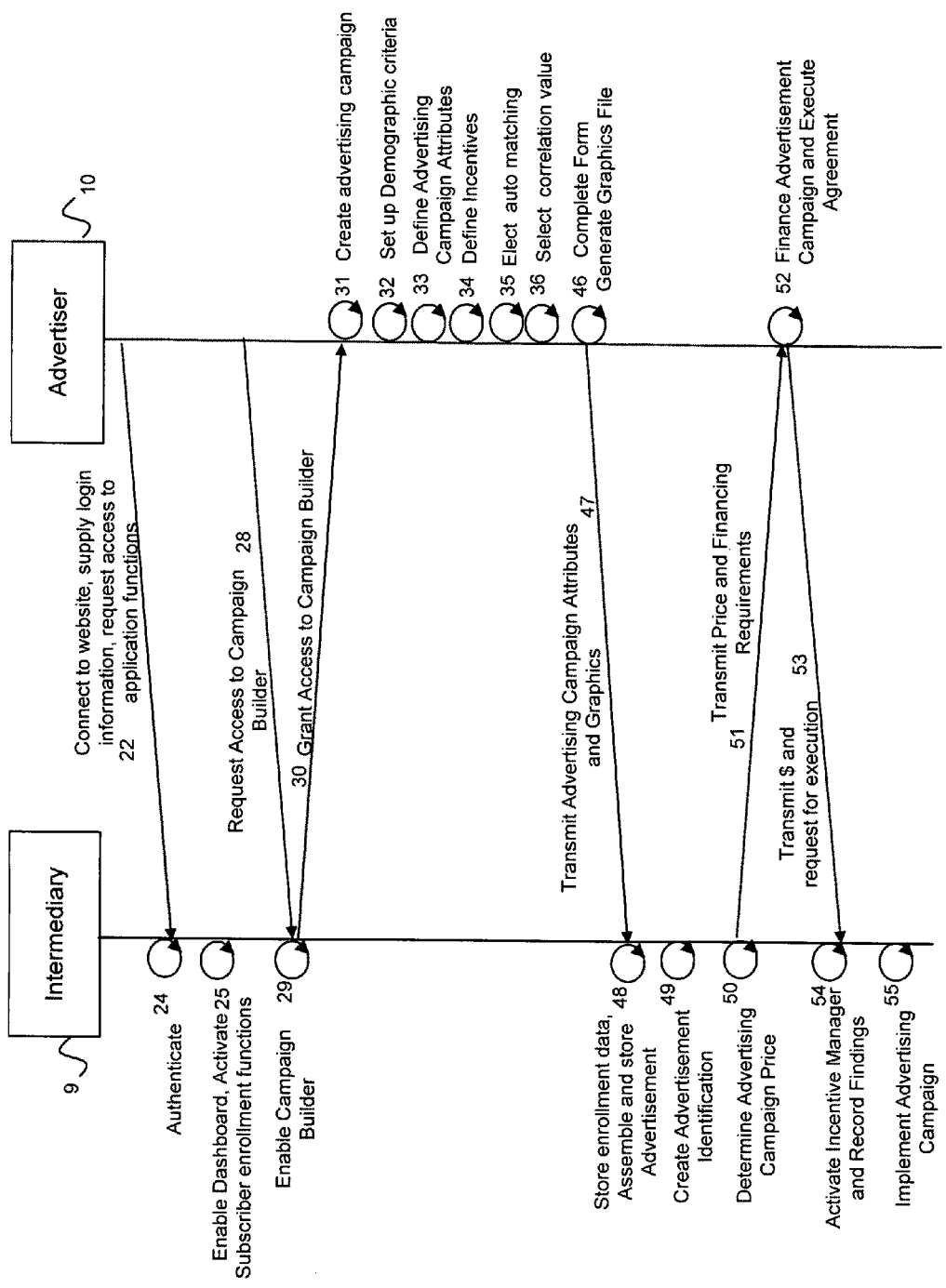
Figure 3 — Advertiser Enrollment Process

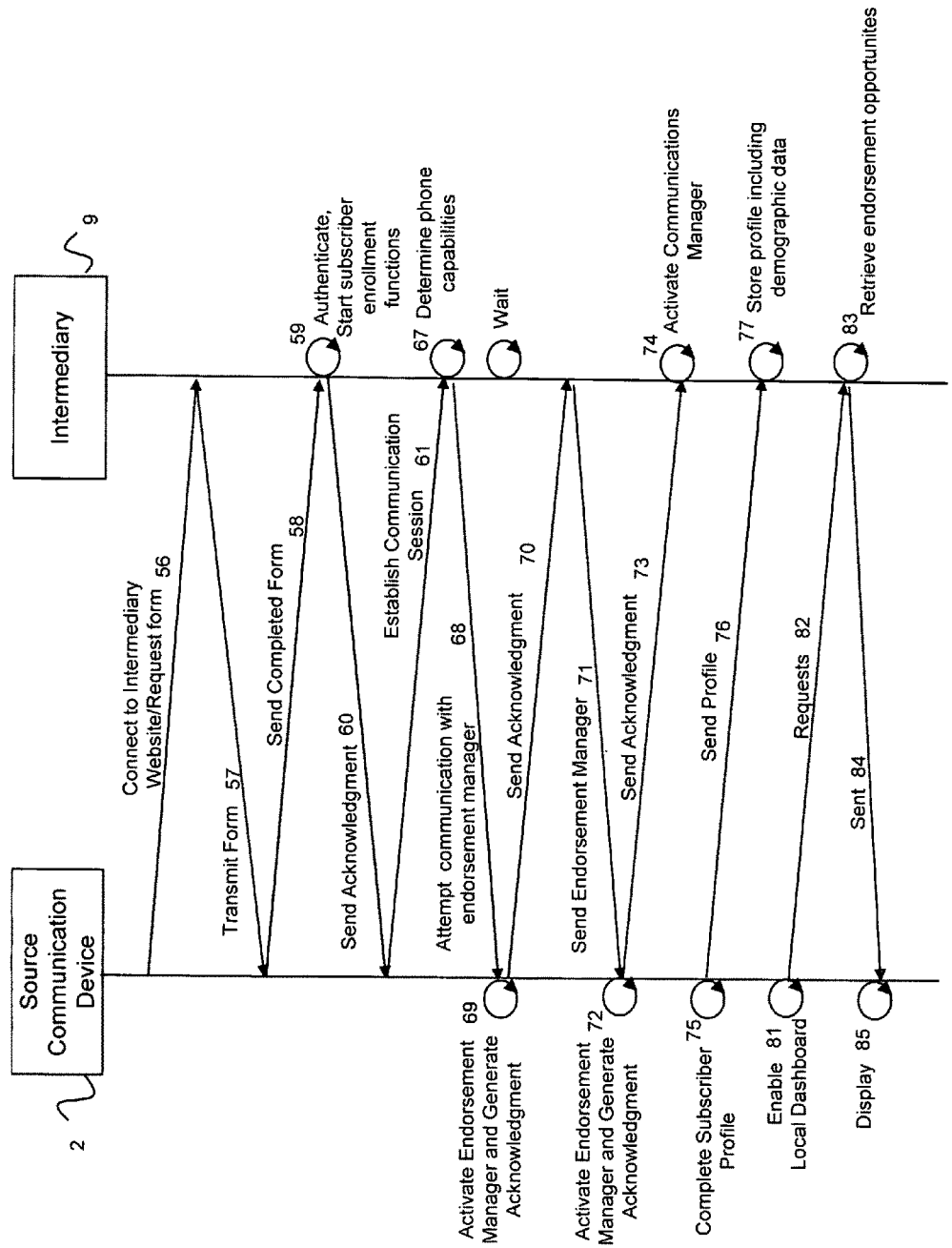
Figure 4    Subscriber Sign Up Process

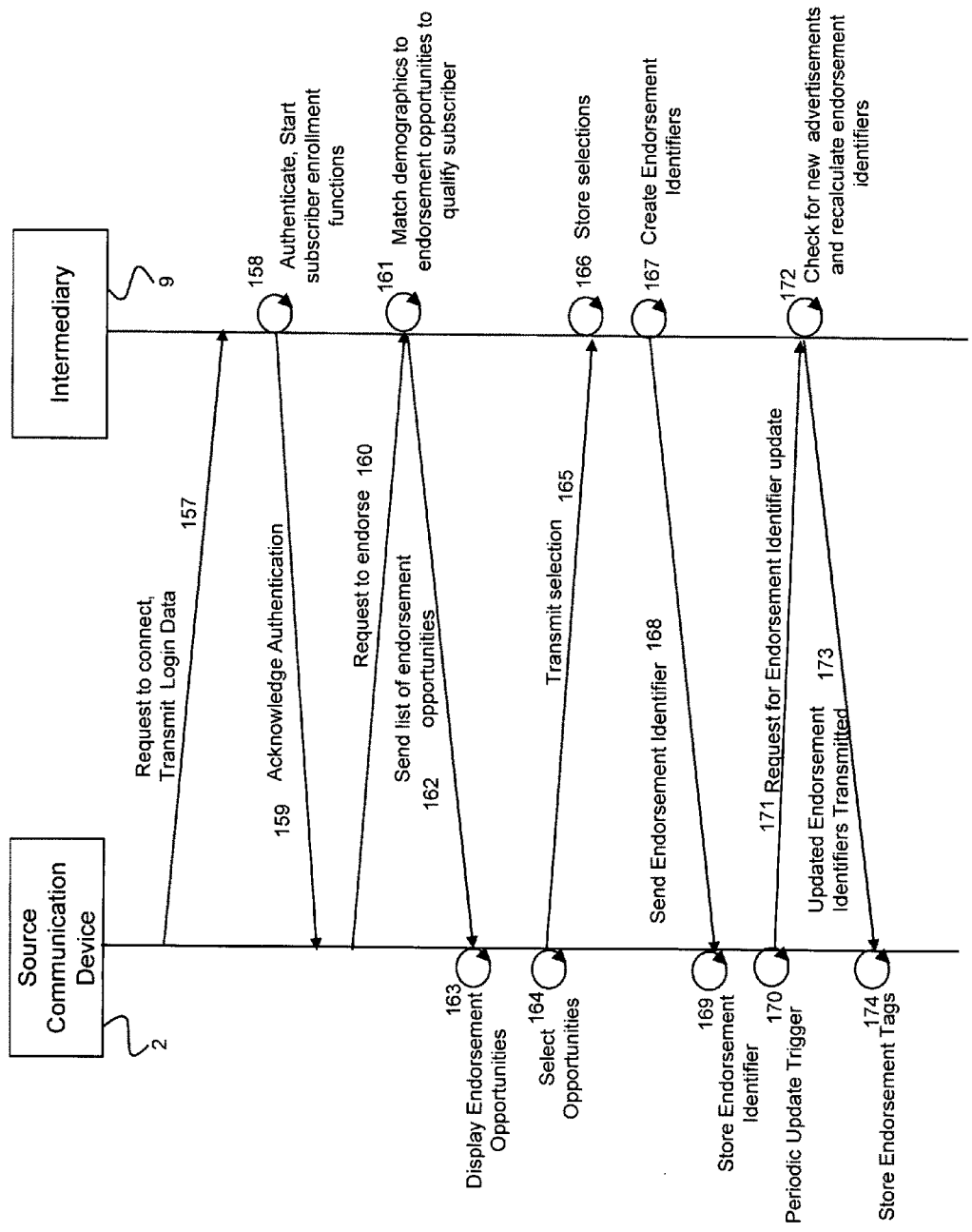
Figure 5A     Manual Subscriber Enrollment Process

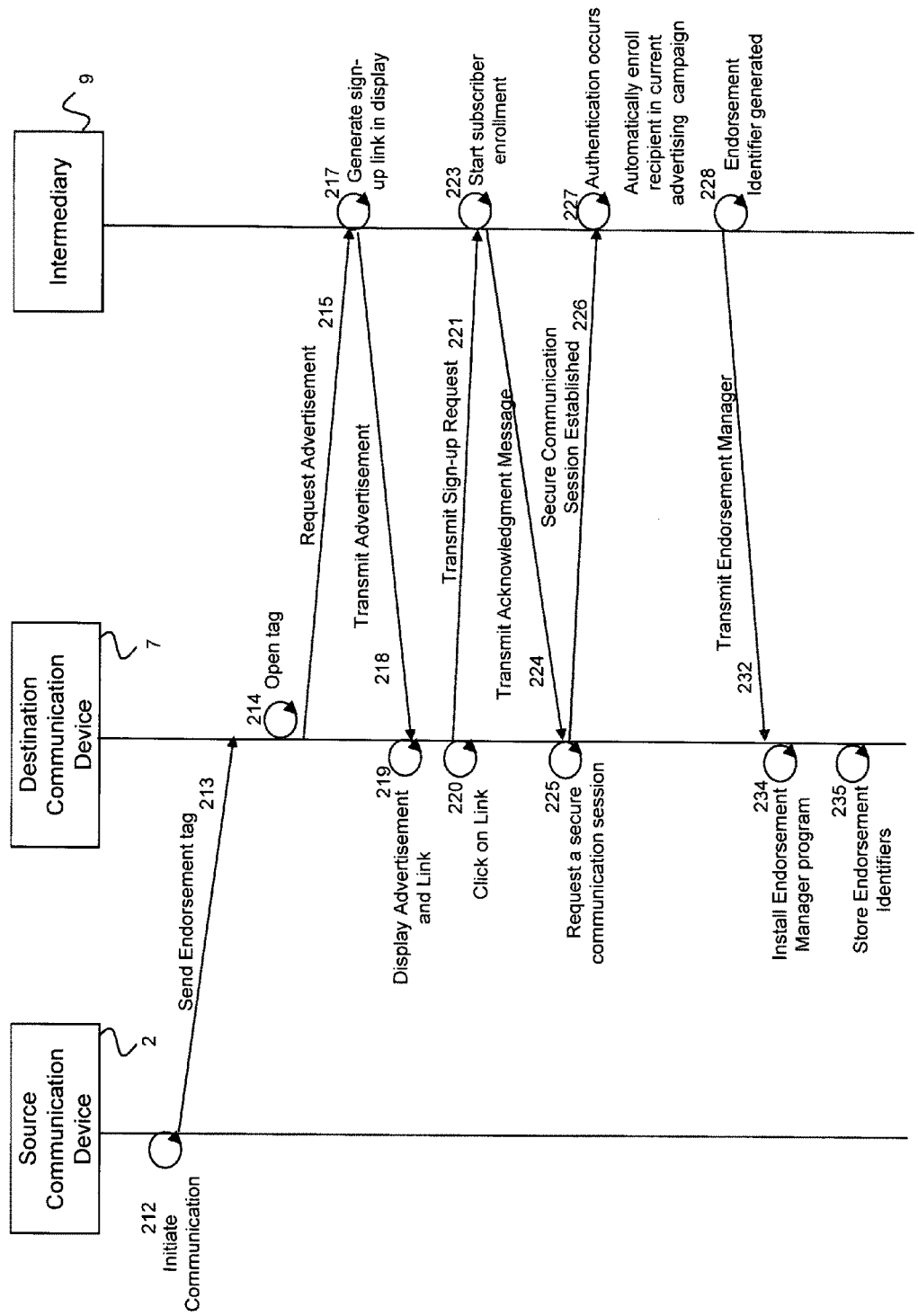
Figure 5B    Automatic Subscriber Enrollment Process

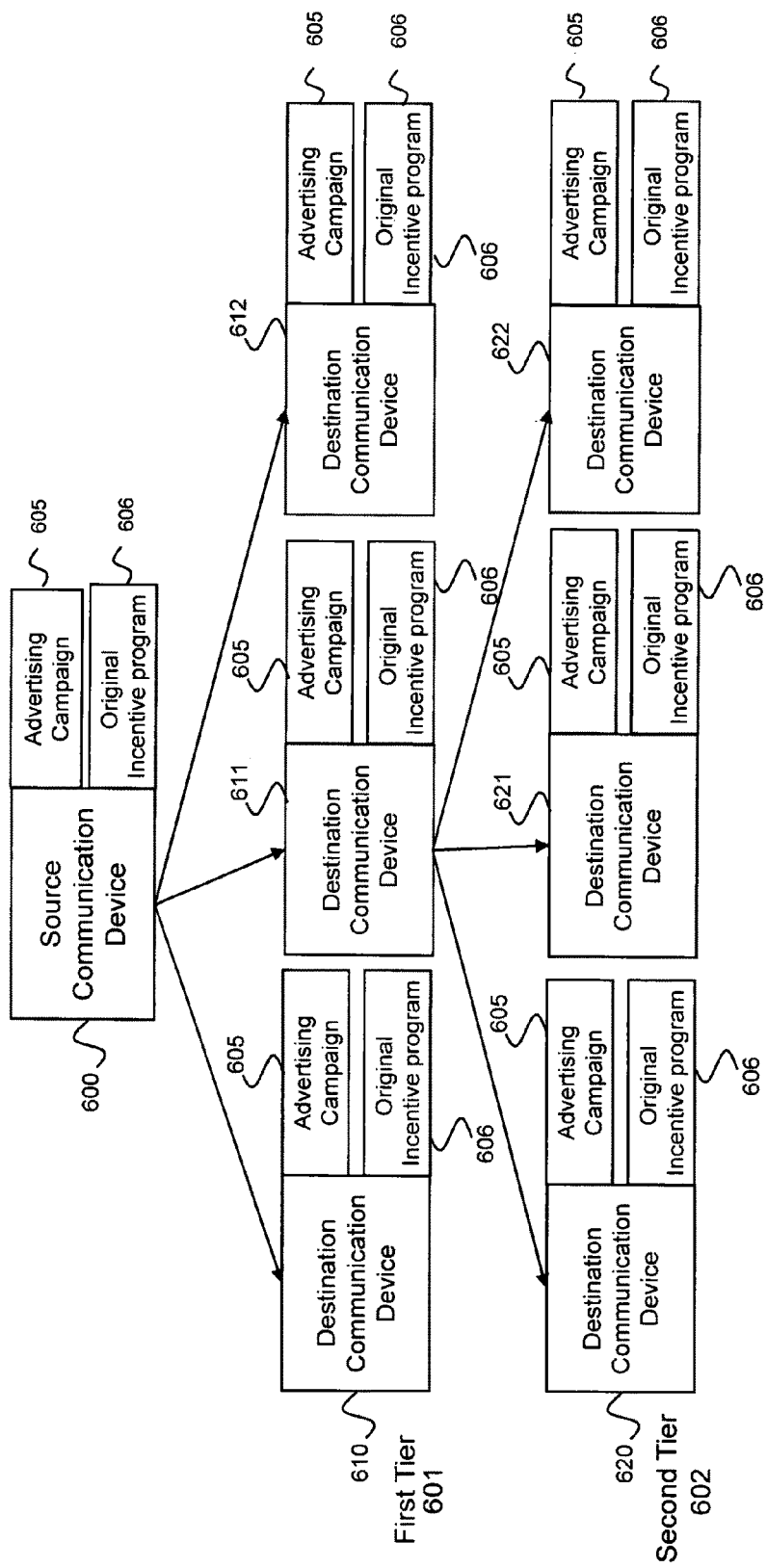
Figure 5C   Automatic Multi-Tier Subscriber Enrollment Process

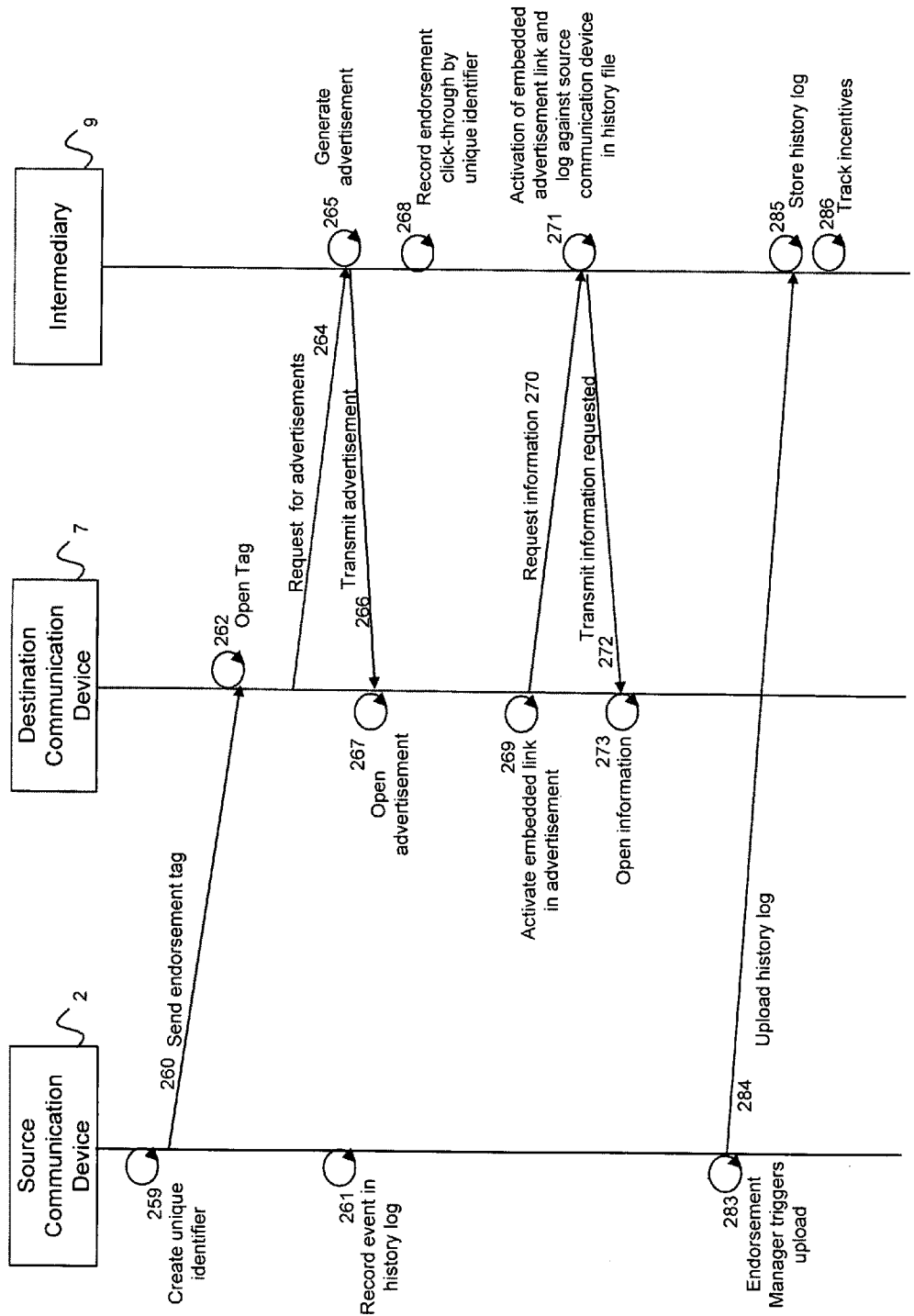
Figure 6 Advertisement Distribution Process

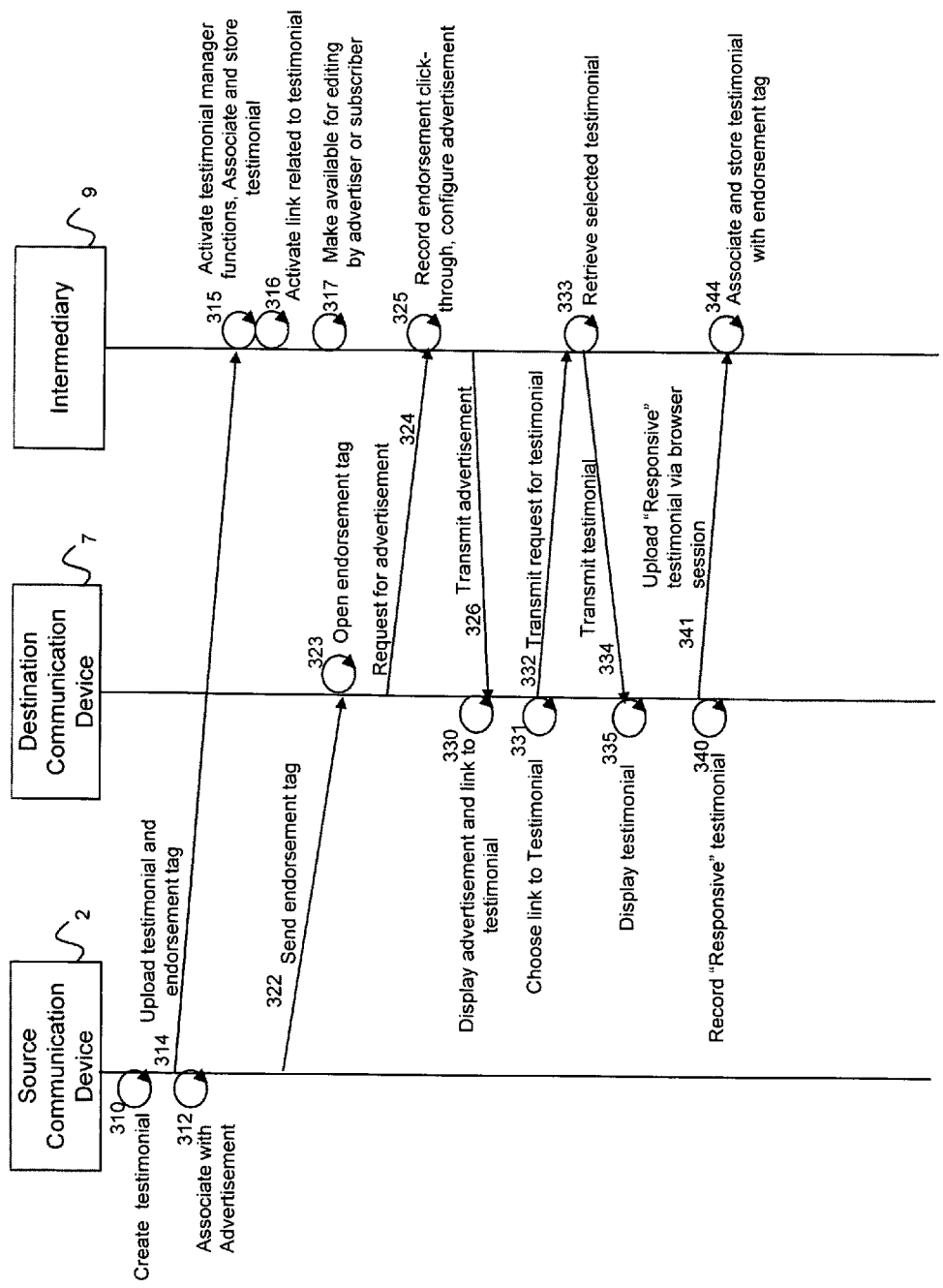
Figure 7  Testimonial Distribution Process

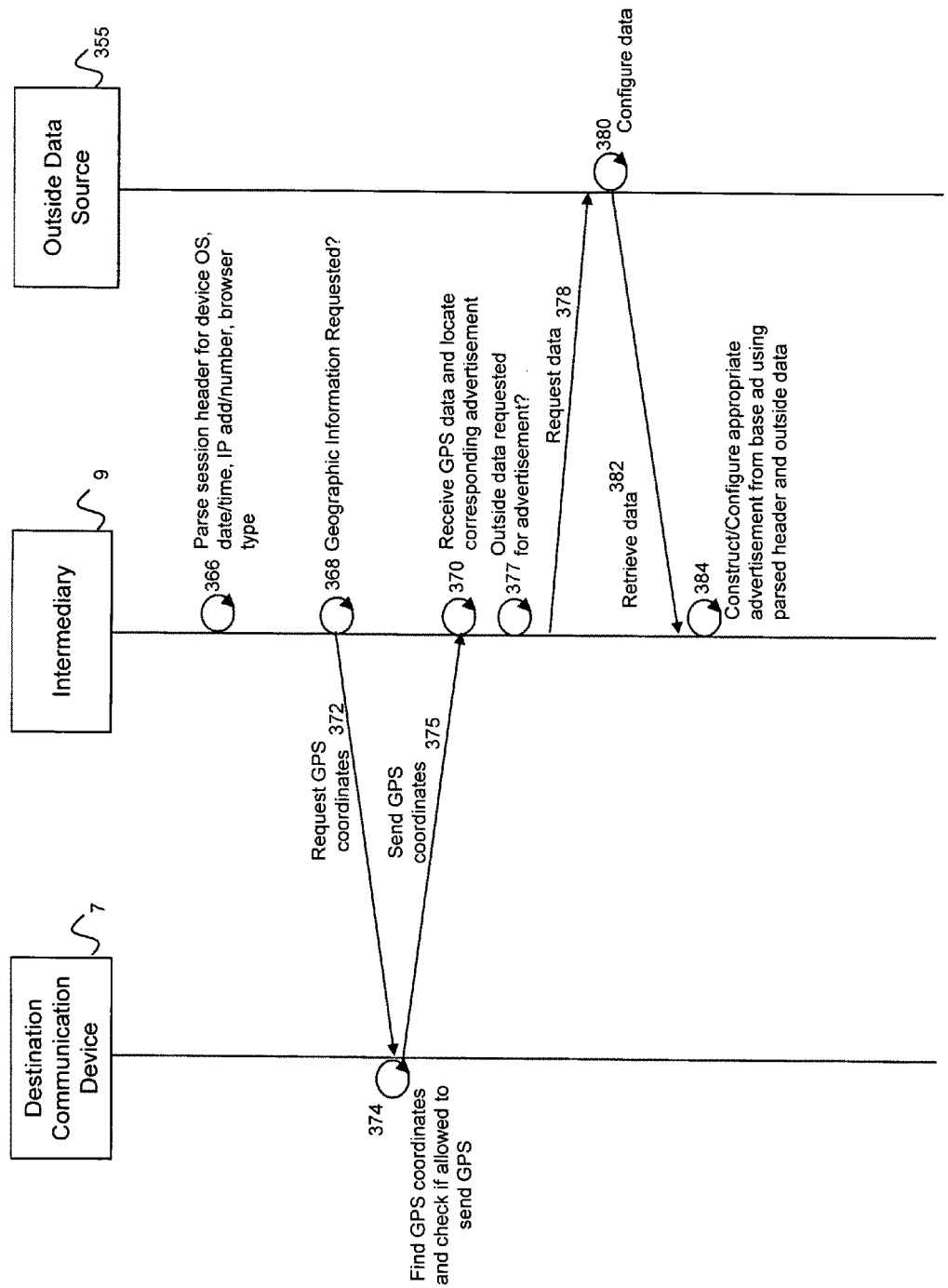
Figure 8  Dynamic Content Advertisement Generation Process

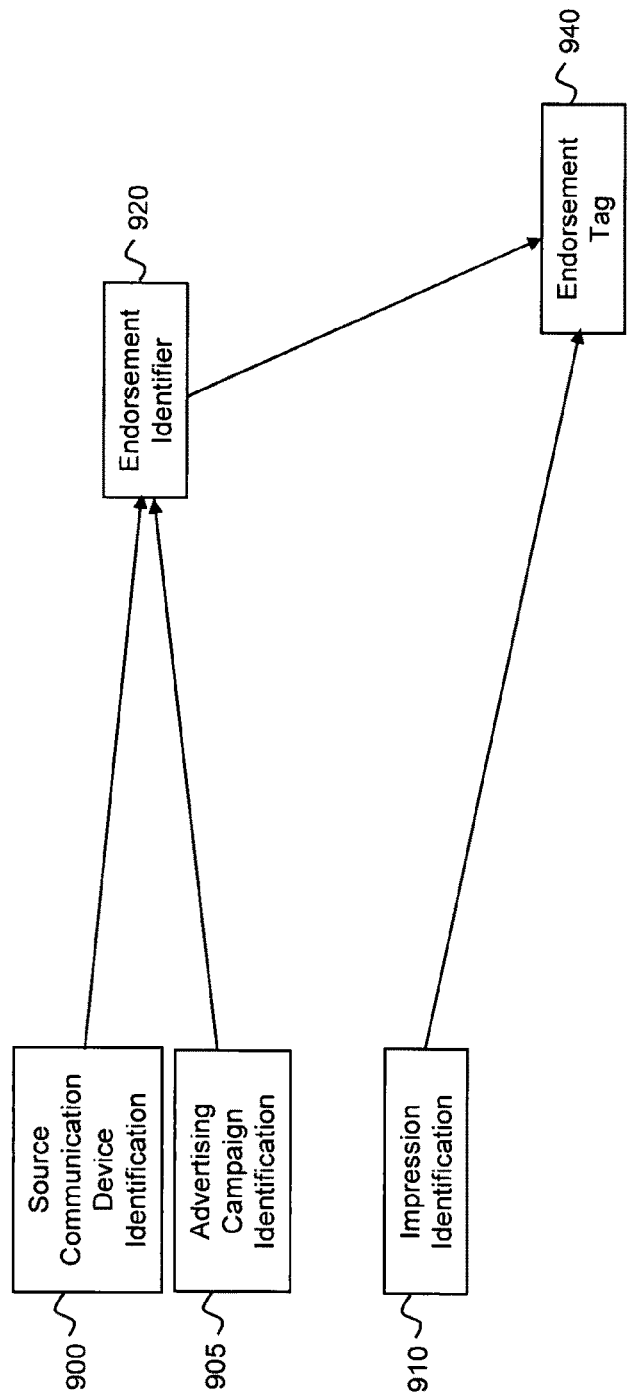
Figure 9            Creation of Unique Identifier

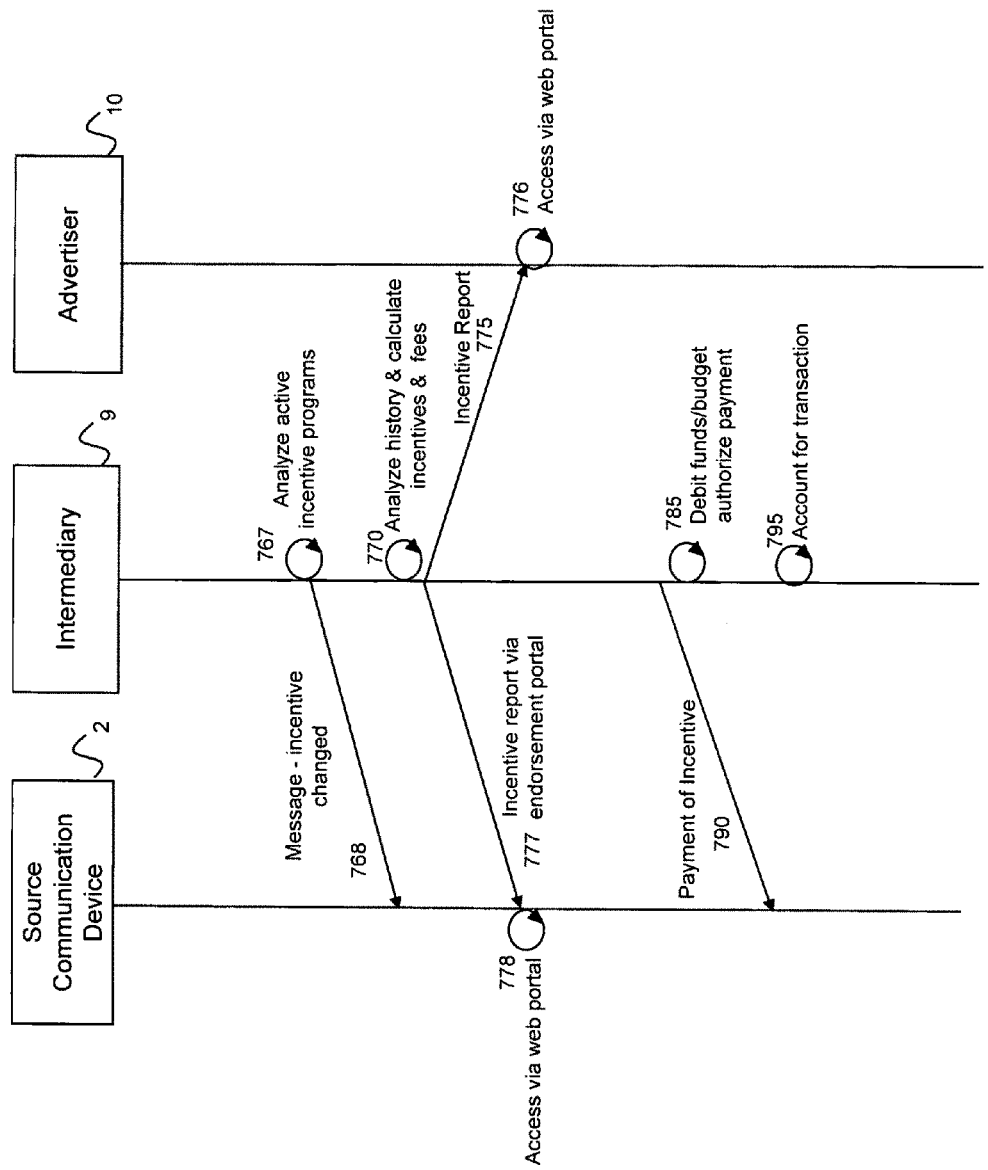
Figure 10  Incentive Administration Process

SYSTEM AND METHOD FOR PROVIDING ENDORSED ADVERTISEMENTS AND TESTIMONIALS BETWEEN COMMUNICATION DEVICES

CROSS-REFERENCE TO RELATED APPLICATIONS

This application claims priority from U.S. Pat. No. 7,664,516 filed on Dec. 23, 2005 and U.S. Provisional Patent Application No. 60/639,267 filed Dec. 27, 2004, entitled "A Method and System for Peer-to-Peer Advertising Between Mobile Devices" and U.S. patent application Ser. No. 12/592,019 filed Nov. 18, 2009 and entitled "System and Method for Peer-to-Peer Advertising Between Mobile Communication Devices." The disclosure in U.S. Pat. No. 7,664,516 and U.S. patent application Ser. No. 12/592,019 are incorporated herein by reference.

BACKGROUND

It is well known that traditional advertising media such as newspapers, public radio and television has suffered a dramatic decrease in popularity and advertising effectiveness with the advent of the internet and mobile phone technology. Advertisers, therefore, are highly motivated to identify new methods of distributing advertisements in order to create effective brand awareness. As newer technologies such as mobile phones evolve into highly sophisticated two-way communication systems, such technologies can be leveraged to provide trackable advertising impressions and brand awareness by directly displaying advertisements and testimonials to potential customers.

Today, consumers can control which advertisements reach them more effectively than in the past. For example, newer technologies like digital video recorders (DVRs) allow users to skip undesirable advertisements. Satellite radio allows users to listen to music without commercials.

With the declining ability to offer advertisements through traditional broadcast advertising media, this invention provides an advertising system that offers frequent and effective advertising to demographically targeted audiences.

This invention also provides a system in which recipients view personally endorsed advertisements by known contacts to increase the acceptance of the advertisement and to link to personalized testimonials of the advertisement for distribution to the existing personal contacts.

This invention also provides a system to incorporate testimonials, related advertisements and for delivering such testimonials with communication devices such as cell phones.

Other advantages and aspects of the invention will become apparent upon reading the following disclosure.

SUMMARY

The system disclosed provides for transmission of an endorsement tag between a source communication device and a destination communication device over a network. The endorsement tag includes a serialized URL link that when activated causes an advertisement to be sent from a third party intermediary to the destination communication device over the network. The intermediary functions to, among other things, identify which advertisement to send by virtue of decoding the serialized URL link and associating that link with a stored advertisement.

The system provides for a "bi-directional" selection process between a subscriber and an advertiser. The bi-directional selection process allows subscribers to choose or "endorse" certain advertisers with which they wish to associate. The bi-directional selection process also allows advertisers to choose which subscribers to use by virtue of a review of related demographic information of each subscriber and pre-qualification of acceptable candidates.

The advertiser determines if the subscriber is pre-qualified based on a correlation between the subscriber's demographics and those desired by the advertiser. Pre-qualification of one subscriber allows the advertiser to target advertisements to a related group of potential customers because the qualified subscriber's contacts presumably share some or all of the same demographic features. Therefore, the contacts of the subscriber provide broad potential market to the advertiser, while requiring only a single demographic comparison to the subscriber. This allows an advertiser to focus its advertisements on favorable target markets without having to examine the demographics of a large number of potentially unqualified prospects.

The system disclosed enables advertisers to reach targeted audiences by contact with mobile communications devices. Current mobile communication devices encourage the recipient of a communication to accept advertisements because the session is identified as being initiated by a known contact. Only after acceptance by the recipient is the advertisement and associated testimonial displayed. Subscribers and recipients are provided incentives to participate. Cash incentives are provided on debit cards or cash distributions.

In another embodiment, tools for social networking, including tools for the creation and display of testimonials, are combined with the incentive programs. These tools encourage recipient comments and follow-up testimonial messages. The embodiment provides for the storage, retrieval and display of the follow-up testimonial messages in connection with an advertisement.

In another embodiment, a hierarchical network of subscribers results from an initial communication. Each subscriber in the hierarchical network inherits features from the original subscriber including features of the original subscriber's profile. The inheritance accelerates the building of qualified subscribers and a broad advertising audience.

Provisions are made for incentive administration and reporting such as collecting regular advertising impression data, periodic processing of the incentive plans and continued updating of advertising campaigns and incentive programs.

It is in the interest of subscribers and advertisers jointly to use the system. For advertisers, click-throughs promote targeted brand awareness which generate demand for products. For subscribers, click-throughs promote incentive payments. Also, there is a recognition of the value of social media networking in relation to raising brand recognition through targeted testimonials related to advertisements.

DEFINITIONS

"Advertisement": a text, picture, video or audio media provided by an advertiser and associated with an endorsement tag.

"Advertiser": an entity providing an advertisement.

"Advertising Campaign": a collection of related advertisements and incentives.

"Advertising Endorsement System": a system for providing advertisements and endorsements between communication devices.

"Computer-readable Medium": any apparatus that can contain, store, communicate, propagate, and transport a computer program for use in connection with the advertising system.

"Destination Communication Device": a computer, cell phone, smart phone or other device capable of receiving a communication message.

"Endorsement": an event of sending an endorsement tag to a recipient.

"Endorsement Tag": an active link including a unique identifier to allow viewing of advertisements and track an advertisement, source communication device and event identification.

"Endorsement Identifier": a unique identification or code composed of a combination of a source communication device identifier and advertising campaign identification.

"Endorser": a subscriber who has selected an advertiser to endorse.

"Incentive": a reward provided to a subscriber based on an endorsement.

"Incentive Program": a set of rules governing an incentive distribution.

"Intermediary": one or more computer servers and memory executing computer applications and communications to implement the advertising endorsement system.

"Qualified Subscriber": a person who meets the demographic criteria of an advertiser.

"Recipient": a person in possession of a destination communication device.

"Source Communication Device": a computer, cell phone, smart phone or other device capable of sending a communication message and an endorsement tag.

"Subscriber": a person in possession of a source communication device, who has created a profile on the intermediary system.

"Testimonial": a text message, picture, audio or video message associated with an advertisement.

It should be understood that the terms advertisement, advertiser, advertising campaign, destination communication device, endorsement, endorsement tag, endorser, incentive, incentive program, intermediary, qualified subscriber, recipient, source communication device, subscriber, and testimonial, while referred to in the singular shall mean their plural forms as well.

BRIEF DESCRIPTION OF THE DRAWINGS

The following disclosure is understood best in association with the accompanying figures. Like components share like numbers.

FIG. 3 a flowchart of an embodiment of the advertiser enrollment process.

FIG. 4 is a flowchart of an embodiment of a subscriber sign-up process.

FIG. 5A is a flowchart of an embodiment of a manual subscriber enrollment process.

FIG. 5B is a flowchart of an alternate embodiment of an automatic subscriber enrollment process.

FIG. 5C is a flowchart of an embodiment including an automatic multi-tier subscriber enrollment process.

FIG. 6 is a flowchart showing an advertisement distribution process.

FIG. 7 is a flowchart showing a testimonial distribution process.

FIG. 8 is a flowchart showing a method of creating dynamic advertisements.

FIG. 9 describes a method for the creation of a unique identifier.

FIG. 10 is a flowchart showing an incentive administration process.

DETAILED DESCRIPTION

Figure 1:
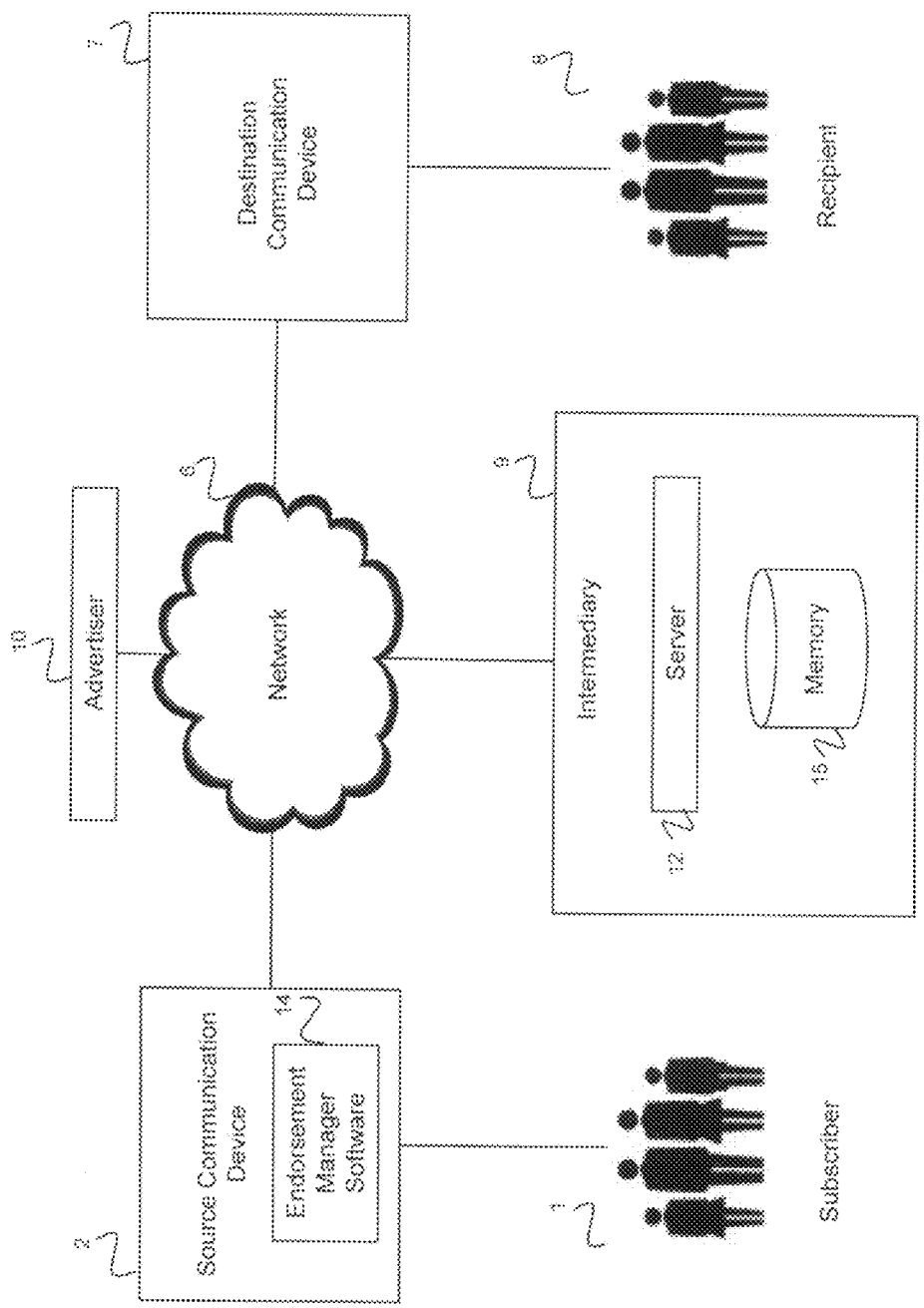
FIG. 1 is a diagram of exemplary components of an advertising endorsement system.

FIG. 1 is a diagram of exemplary components of an advertising endorsement system for providing direct advertising between communication devices and to provide testimonials in relation to advertisements. Subscriber 1, in possession of a source communication device 2, subscribes to an advertisement incentive program managed by an intermediary 9 to distribute advertisements from advertiser 10 to destination communication device 7 in possession of recipient 8.

Intermediary 9 includes a server 12, running a group of application programs and communicating with memory 15.

Source communication device 2 is in communication with destination communication device 7 via network 6. Examples of network 6 may be the Internet, a private network, a cellular phone network, or other service provider networks. The source communication device and the destination communication device preferably support digital communications and sharing and recording of electronic files such as audio, pictures, text and video. Preferred communication devices include cellular phones, smart phones, personal computers, personal digital assistants and instant messaging devices.

Operating systems running on source communication device 2 and destination communication device 7 coordinate and provide control of various components. Object-oriented software systems are preferred. The software systems run in conjunction with the operating system and provide calls to the operating system programs or applications executing on the source communication device 2 and destination communication device 7.

Source communication device 2 communicates with destination communication device 7 using a communications protocol. Examples of the communication protocol include Transmission Control Protocol/Internet Protocol (TCP/IP); Global System for Mobile Communications (GSM) including Short Messaging Service (SMS), multimedia messaging service (MMS), Code Division Multiple Access (CDMA), Wireless Application Protocol (WAP), 3G and 4G communication services including SMS and MMS protocols.

Advertiser 10 includes a communication device capable of communicating with intermediary 9 over network 6. Examples include servers and personal computers connected to the network.

In use, the system is activated by the advertiser initiating an advertising program. To initiate an advertising program, the advertiser is required to complete a setup process, provide a set of demographic criteria and build and upload advertisements to memory 15. Application functions are configured to operate on server 12 to accomplish the setup, build and upload processes.

Subscriber 1 must sign up and enroll on the intermediary. To sign up, subscribers are required to complete a set-up process, including submission of a demographic profile to the intermediary.

The intermediary compares each demographic profile to the demographic criteria of the advertisers to determine whether or not the subscriber is qualified. Based on the subscriber qualifications, a set of endorsement opportunities from various advertisers is communicated to a subscriber by the intermediary.

Subscriber 1 elects to endorse an advertisement, advertiser or advertising campaign. Endorsement manager software 14 is loaded on source communication device 2. The endorsement manager software, in concert with functions resident on server 12 facilitate completion of the setup process, endorsement process and transmission of advertisements and testimonials to the destination communication device.

When a communication is transmitted between source communication device 2 and destination communication device 7, an endorsement tag is transmitted to destination communication device 7. The endorsement tag includes a URL link with an embedded code that identifies the source communication device, the advertisement or advertising campaign and an impression identification. When the endorsement tag is activated by the destination communication device, the endorsement tag is decoded by the intermediary and used to locate the requested advertisement. The associated advertisement is downloaded to the destination communication device from the intermediary. The advertisement associated with the endorsement tag may be said to be "endorsed" by subscriber 1.

Subscriber 1 may then elect to provide a "testimonial." To do so, Subscriber 1 preferably uses the source communication device to record a testimonial to be associated with an advertiser, advertisement or advertising program. The testimonial is then uploaded to the intermediary where it is associated with the advertisement, advertising campaign or advertiser, and stored at the intermediary.

After a communication between the source communication device and the destination communication device, a link is transmitted by the intermediary to the destination communication device that points to a list of testimonials. When the link is activated by the destination communication device, the intermediary transmits the testimonial to the destination communication device.

Figure 2:
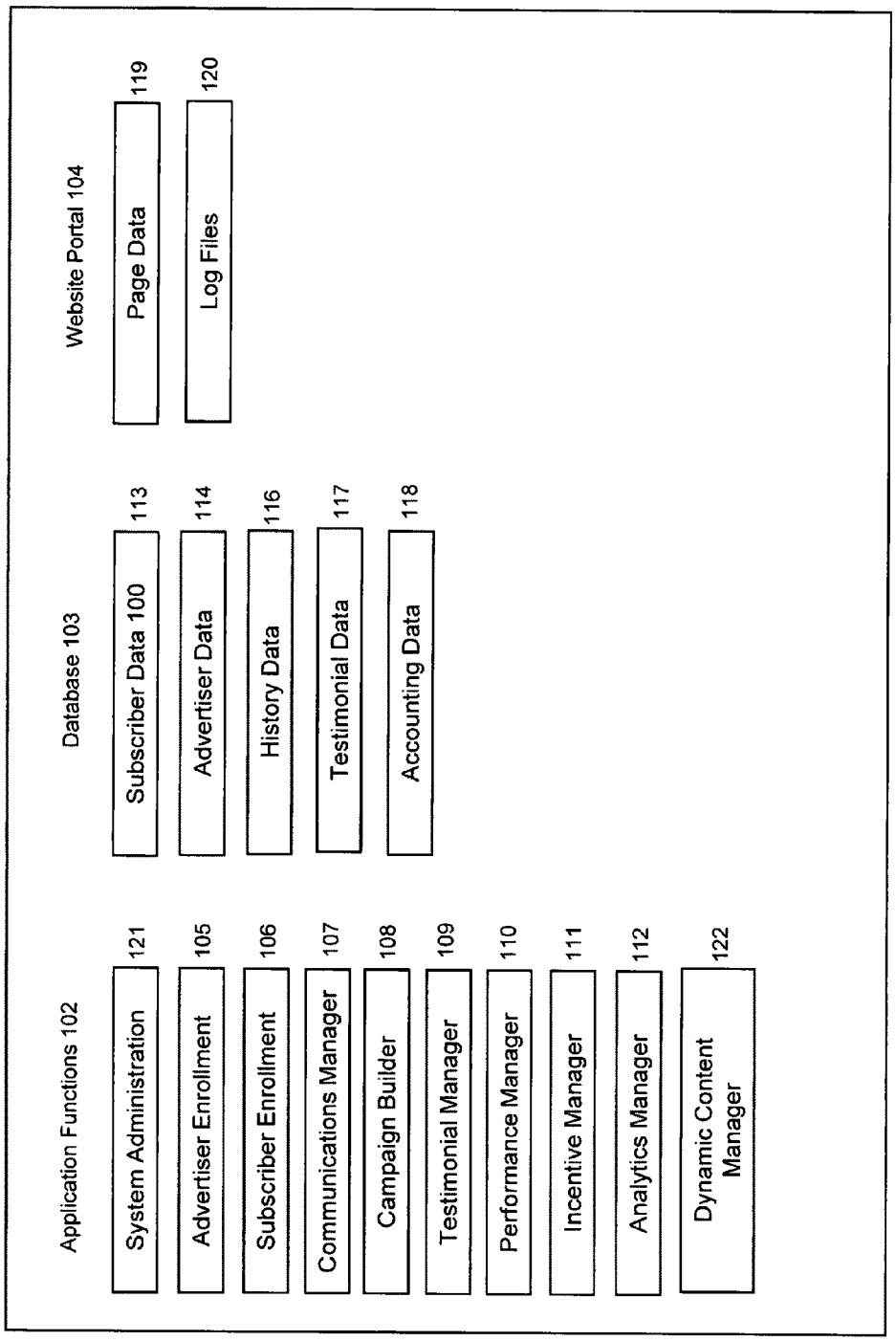
FIG. 2 is a block diagram of exemplary components of the intermediary.

Referring then to FIG. 2, intermediary 9 includes application functions 102, database 103 and website portal 104.

Application functions 102 include numerous constituent programs and objects which cooperate to carry out the functions of intermediary 9. In the preferred embodiment, the application functions comprise software written in object oriented languages. These include system administration 121, advertiser enrollment 105, subscriber enrollment 106, communications manager 107, campaign builder 108, testimonial manager 109, performance manager 110, incentive manager 111, analytics manager 112 and dynamic content manager 122.

System administration 121 provides for administration and maintenance of the various objects, including database management and management of website portal 104. Creation, deletion and editing of files and profiles is provided. Functions for screening of testimonials and demographic criteria are also provided.

Advertiser enrollment 105 coordinates and records the interaction between advertiser 10 and intermediary 9, as will be further described.

Subscriber enrollment 106 controls and records the interaction between the subscribers and the intermediary, as will be further described.

Communications manager 107 coordinates the functions between the endorsement manager software resident on the source communication device and the intermediary.

Campaign builder 108 is responsible for creating, coordinating and organizing campaigns and associated advertisements which are transmitted to the destination communication device. In the preferred embodiment, campaign builder 108 includes a set of design criteria including dimensions, preferred fonts, colors, and other graphics tools which are supplied to the advertiser via website portal. In an alternate embodiment, campaign builder 108 provides predetermined advertisement formats suitable for inclusion of custom text paragraphs to speed advertisement development. Once an advertisement is built, it is uploaded for storage in database 103. Campaign builder 108 also provides for grouping of advertisements into "campaigns." Each campaign may include attributes of timelines for deployment of each advertisement, incentive programs and demographic and psychographic criteria for qualified subscribers.

Testimonial manager 109 provides the management functions for the organizing and storage of testimonials provided by subscribers and recipients. In a preferred embodiment, testimonial manager 109 provides "housekeeping" functions for the receipt, organization and storage of testimonials received by subscribers and recipients. The testimonial manager receives individual testimonial files, according to their type, audio, video, text or picture. The files may be edited by the intermediary through system administration 121. The testimonial manager provides the functions of editing the testimonial files for content, size and graphics by the advertiser, the subscriber or the intermediary. The testimonial manager also provides the function of associating the testimonials with a particular advertisement, advertising campaign or advertiser.

Performance manager 110 provides the function of receiving and storing history log files from source communication devices by way of communication manager 107.

Incentive manager 111 coordinates the functions of tracking subscriber incentives and incentive payouts. In a preferred embodiment, the Incentive manager also provides the functions of communication with financial institutions to receive payments from advertisers. Incentive manager 111, in a preferred embodiment, is also responsible for the functions of processing distributions to subscribers as incentives, and for tracking all accounting functions of the system. In practice, the incentive manager pays incentives to subscribers and corresponding advertising incentive program accounts are debited until depletion, at which time the incentive programs are discontinued for a particular campaign.

Analytics manager 112 is responsible for providing the functions of report generation utilized to analyze and report data related to subscribers, recipients, advertising campaigns, advertisements, endorsements and testimonials. Analytics manager 112, in a preferred embodiment, also provides the functions of statistical analysis and prediction generation based on historical data to determine the effectiveness of an advertisement or advertising campaign. In a preferred embodiment, analytics manager 112 is also responsible for statistical analysis of the demographics of purchasing patterns related to demographics, geographic location, and time of day or date during the year.

Database 103, in a preferred embodiment, is preferably comprised of a relational database written in a structured query language. The database allows interrogation for information retrieval and report generation, as well as maintenance.

Database 103, in the preferred embodiment, includes subscriber data 113, advertiser data 114, history data 116, testimonial data 117 and accounting data 118.

Subscriber data 100 includes demographic information, psychographic data, identification information and login information for each subscriber. Subscriber data 100 also includes endorsement preferences and incentive preferences for each subscriber.

Advertiser data 114 includes advertiser identification and log-on information. Advertiser data 114 also includes chosen demographic criteria for subscribers supplied by each advertiser. Advertiser data 114 includes advertising campaign data. Advertising data 114 further includes distribution preferences for timing and geographic location of each advertisement in the advertising campaign.

Advertiser data 114 further includes identification of incentive programs. Incentive programs include rules for incentive distribution to subscribers. Incentive programs are defined per advertisement or per advertisement campaign. Incentive program rules further include initiation and termination dates for each advertisement and advertisement campaign.

Advertiser data 114 further includes a maximum financial budget for each incentive, advertisement and advertisement campaign. Advertiser data 114 further includes matching data for subscribers.

History data 116 includes a compilation of data for each advertisement and advertising campaign, including the number of advertisements sent, the subscriber who sent them, the recipient of the advertisement, the number, location and identification of all click-through events.

Testimonial data 117 includes text, graphics, audio and video files recorded as testimonials stored and associated with a related advertisement and advertising campaign in the database.

Accounting data 118 includes account information for advertisers, historical information reflecting incentives paid to subscribers, and tracking information for singular and multi-tiered distribution of funds.

Website portal 104 includes the functions related to operation of page data 119 and log files 120.

Page data 119 includes pages stored in memory capable of various communication functions required by the system. Page data 119 includes pages for subscriber addition, deletion and profile creation and maintenance. Similarly, page data 119 includes pages for the creation and maintenance of advertiser profiles, advertisements, advertisement campaigns and incentives through campaign builder 108, incentive manager 111 and analytics manager 112. Pages are also provided for addition and deletion of testimonials in coordination with testimonial manager 109.

Log files 120 include metrics of page usage and maintenance. For maintenance of the intermediary website in coordination with system administration 121.

Referring now to FIGS. 2 and 3, the advertiser enrollment process will be described. At step 22, advertiser 10 connects to intermediary 9 via the website portal. Login information is supplied and a request is made to access application functions 102 through a secure communications session. At step 24, the intermediary authenticates the advertiser login information. At step 25, application functions of advertiser enrollment 105 are activated and coordinate functions of the advertiser enrollment process.

The advertisements for the advertising campaign must be "built" and the attributes of the advertising campaign defined. At step 28, a request is made for access to the campaign builder function 108 of application functions 102. At step 29, the intermediary enables a campaign builder dashboard. At step 30, the intermediary grants access to the campaign builder function to advertiser 10. At step 31, forms related to creation of an advertising campaign the specific type of advertisement are completed by advertiser 10.

At step 32, demographic criteria for qualification of subscribers is submitted.

In step 33, advertisement attributes are defined and include the scheduling timeline for distribution of the advertisements in the advertising campaign and a limit for the incentive pay out.

At step 34, an incentive program is defined. The incentive program may pay cash incentives, incentivize communication fees, offer product discounts, generate "rewards points" or provide product or service credit. The preferred embodiment of an incentive program utilizes a programmable electronic debit card to which credits are periodically uploaded. Incentive program selections may be made according to predefined incentive program types displayed and captured by a web form. The incentive program further requires specifying the incentive pay out. For cash and cash-like incentives (e.g. discounts or coupons) the preferred incentive program specifies an incentive amount for each recorded impression, an incentive amount for each recorded click-through, and an incentive amount for each product sale resulting from a specified transaction.

At step 35, an option "auto matching" is provided. "Auto matching" is provided in three forms. First, "auto matching" may be enabled for all advertising campaigns of an advertiser. If so, each subscriber who becomes "qualified" is enabled to "endorse" every advertisement and every advertising campaign for the advertiser specified. Second, "auto matching" may be enabled for advertising campaign. If so, each qualified subscriber is enabled to "endorse" each advertisement in the specified advertising campaign. Third, "auto matching" may be enabled for a specific advertisement. If so, each qualified subscriber is automatically qualified to endorse a specific advertisement for a specific advertising campaign.

At step 36, the advertiser selects a correlation value. The correlation value is a numerical measure of how closely the demographic criteria of the advertiser must match the demographic profile of the subscriber.

Also at step 46, graphics files are generated including custom graphics required for the advertisement by advertiser 10 to complete each advertisement.

At step 47, the completed form and graphics files and the demographic criteria, auto matching choice, advertising campaign attributes and incentive programs are uploaded to the intermediary. At step 48, intermediary 9 stores the uploaded data and assembles and stores the advertisement associated with advertiser 10 in the database in advertiser data 114. At step 49, the advertisement is assigned a unique identification number by the intermediary and is stored in the database under advertising data 114.

At step 50, the intermediary determines the price of the advertising campaign. At step 51, the intermediary transmits the price and funding requirements to the advertiser. In the preferred embodiment, the financing requirements include execution of a written agreement and prepayment of money to fund the incentive programs according to the requested advertising budget.

At step 52, the advertiser funds the advertising campaign and executes the advertisement agreement. At step 53, the advertiser transmits funding to the intermediary and requests execution of the advertising campaign. Funding preferably includes transmission of a cash amount to the intermediary via wire transfer. At step 54, the intermediary records receipt of the funding and creates a record in the database in accounting data 118 by incentive manager 111. At step 55, the intermediary implements each advertising campaign.

Referring to FIGS. 2 and 4, the subscriber sign-up process will be described. In step 56, source communication device 2 connects to the Intermediary 9 through website portal 104. In step 57, a request for information is sent via a form to the source communication device from the intermediary. The form requests basic information such as communication device user's name, communication device type, and a communication device identification number such as a phone number or IP address. At step 58, the source communication device responds by transmitting the completed form including a requested username and password. At step 59, the intermediary authenticates the source communication device and starts subscriber enrollment functions 106. Authentication may include cross-checking the phone number or the device identification and the profile information of the user with publicly available data sources. At step 60, the intermediary sends a text message to the source communication device confirming setup. At step 61, the source communication establishes a secure communication session with the intermediary using the website portal.

In step 67, a determination is made by the intermediary as to whether the source communication device has the technical capability to participate. At step 68, the intermediary then checks the source communication device for an endorsement manager program by attempting to communicate with it. At step 69, if the endorsement manager is present, a return acknowledgment message is generated. At step 70, the acknowledgment message is sent to the intermediary. At step 71, if the endorsement manager program is not present, then it is retrieved by the source communication device. At step 72, the endorsement manager program is installed and is activated and an acknowledgment message is generated. At step 73, the acknowledgment is returned to the intermediary. At step 74, application functions of the communications manager are activated.

In step 75, a subscriber profile form is completed. The subscriber profile includes subscriber demographic information. Subscriber demographic information includes gender, age, zip code, and may include other information such as ethnicity, income level, property ownership and education. The subscriber profile also may include user's hobbies, interests, affiliations and other psychographic information. At step 76, the subscriber profile is sent to the intermediary. At step 77, the Intermediary receives and stores the profile data in subscriber data 100 in the database. At step 81, the endorsement manager program enables a local endorsement dashboard. At step 82, the endorsement manager program requests transmission of endorsement opportunities. At step 83, the intermediary retrieves the requested endorsement opportunities. At step 84, the endorsement opportunities are sent from the intermediary to the source communication device. At step 85, the endorsement opportunities are displayed.

FIG. 5A shows a preferred manual subscriber enrollment process. Referring then to FIGS. 2 and 5A, at step 157, the source communication device connects to the intermediary web portal and transmits login data. At step 158, the login data is authenticated and functions of subscriber enrollment 106 are started. At step 159, an acknowledgment is transmitted. In step 160, the source communication device sends a request to endorse. At step 161, the intermediary responds to the request by performing a matching process to qualify subscribers for endorsement opportunities.

The matching process correlates the demographic profile data from the subscriber with the demographic criteria of the advertiser. A correlation value is assigned by the intermediary. In the preferred embodiment, the correlation value is calculated by comparing each element of the demographic criteria to each element of the demographic profile to arrive at a correlation value.

At step 162, the intermediary returns a list of endorsement opportunities for which the subscriber is "qualified." Each endorsement opportunity includes a description of the advertiser, advertising campaign, advertisement and incentive program including incentive values offered.

In an alternate embodiment, step 162 includes the steps of the intermediary providing a list of non-participating advertisers to the subscriber or the ability to suggest an unlisted advertiser.

The endorsement opportunities are displayed at step 163. In step 164, the subscriber selects a subset of the endorsement opportunities for enrollment. The subset selection is transmitted to the intermediary at step 165. At step 166, intermediary stores the selected subset in the database in subscriber data 113. At step 167, the intermediary creates a set of endorsement identifiers for each of the endorsement opportunities of the selected subset. The endorsement identifiers include embedded URLs and endorsement identifiers to serialize each specific endorsement tag with a unique code.

Referring to FIG. 9, endorsement identifier 920 is created by calculating a hash code between source communication device identification 900 and an advertising campaign identification 905. An example is shown below:

http://bca2.com/ad.aspx?d=12V7NS8MPTXGTFL

The source communication device identification is preferably the device serial number or the phone number.

Returning to FIG. 5A, at step 168, the endorsement identifier is sent to the source communication device. At step 169, the endorsement identifier is stored on source communication device by the endorsement manager program. In step 170, the endorsement manager program periodically triggers a refresh for endorsement identifiers from the intermediary. At step 171, updated endorsement identifiers are requested. At step 172, the intermediary automatically updates the endorsement identifiers incorporating current versions of campaign or advertisement identifications. At step 173, updated endorsement identifiers are transmitted. At step 174, the updated endorsement identities are stored on the source communication device by the endorsement manager program.

Once endorsement identifiers are stored on the source communication device, the "subscriber" becomes an "endorser" capable of participating in distribution of advertisements and incentive programs. A "bi-directional selection" has occurred between the subscriber and the advertiser where each has "chosen" the other and has agreed to participate in distribution of advertisements.

FIG. 5B is a flowchart of an alternate embodiment showing an automatic subscriber enrollment process. Referring then to FIGS. 2 and 5B, in step 212, the source communication device initiates a communication to the destination communication device. In step 213, the endorsement tag is sent from the source communication device to the destination communication device in connection with the communication. In step 214, the destination communication device opens the endorsement tag. The endorsement tag is clicked, thereby activating the link incorporated in the endorsement tag. In step 215, a request for an advertisement to the intermediary is sent.

In step 217, the intermediary generates the advertisement. Included in the advertisement is a sign-up link for "automatic" sign-up. In step 218, the advertisement is sent to the destination communication device. The advertisement is displayed at step 219. The destination communication device activates the automatic sign-up link in step 220. A sign-up request is sent to the intermediary at step 221. At step 223, the Intermediary starts the functions of subscriber enrollment 106. At step 224, intermediary 201 acknowledges the sign-up request by sending an acknowledgement message. The acknowledgement message contains a link to download the endorsement manager. At step 225, the destination communication device requests a secure communication session using the web portal. A secure communication session is established at step 226.

In step 227, authentication occurs and the destination communication device is automatically enrolled in the advertising campaign associated with the advertisement that was displayed. At step 228, a unique endorsement identifier is generated for the destination communication device as a new qualified subscriber. In step 232, the endorsement manager program along with the endorsement identifier: is sent to the destination communication device. At step 234, the endorsement manager program is installed and activated. At step 235, the endorsement identifier is stored by the endorsement manager program.

FIG. 5C shows an alternate embodiment of an automatic multi-tier subscriber enrollment process. As destination communication devices 610, 611 and 612 are automatically enrolled, they automatically inherit the status of qualified subscriber attributed to the source communication device for advertising campaign 605 associated with the advertisement viewed. The advertising campaign includes original incentive program 606. Destination communication devices 610, 611 and 612 comprise first tier 601 of destination communication devices. Similarly, when destination communication devices 620, 621 and 622 are automatically enrolled, they also automatically inherit the status as a qualified subscriber for advertising campaign 605 and original incentive program 606 creating second tier 602 of destination communication devices. Additional tiers of destination devices are created as they receive communications from first tier communication devices 601 and second tier destination communication devices 602. Each additional tier of destination communication devices inherits the status as a qualified subscriber for advertising campaign 605 and original incentive program 606. The intermediary generates endorsement identifiers for each new destination communication device in each new tier of destination communication devices. The endorsement identifiers each contain the source communication device identification. The source communication device identification is used to track incentives paid to the source communication device from endorsement transactions performed by the first tier, second tier and additional tiers of destination communication devices.

FIG. 6 shows a flowchart of the advertisement distribution process of the system. Referring then to FIGS. 2 and 6, at step 259, the endorsement manager program generates a unique identifier.

Referring to FIG. 9, impression identification 910 is hashed with endorsement identifier 920 to create unique identifier 940. In the preferred embodiment, the endorsement manager program generates a number based on elapsed time from a predefined event in the past, such as the date that endorsement manager software was installed, on the subscriber communication device. An example is shown below:
http://bca2.com/
ad.aspx?d=12V7NS8MPTXGTFL&i=8efvy In alternate embodiments, other information may be combined to create unique identifier 940, such as date and time information, geographic location information and device settings of the source communication device.

Returning to FIG. 6, at step 260, the endorsement manager program sends the endorsement tag containing the unique identifier to the destination communication device. At step 261, the endorsement manager software records the transmission of the endorsement tag as an event in a history log. In step 262, the endorsement tag is opened on the destination communication device. At step 264, a request for an advertisement is sent from the destination communication device by activating the URL link embedded in the endorsement tag. At step 265, the intermediary generates and formats an advertisement.

In a preferred embodiment, the step of generating an advertisement includes the dynamic content manager 122 of intermediary 9 decoding the hashed unique identifier in the endorsement tag and decoding advertisement identification 905. The dynamic content manager then fetches the appropriate advertisement graphics called for by the advertisement identification from the database and formats it to match the device type of destination communication device.

FIG. 8 is a flowchart showing the detail of an alternate embodiment of dynamic advertisement generation. In step 366, the intermediary parses the web browser session header for the destination communication device OS; time/date stamp, IP address and browser type. In step 368, the intermediary determines if geographical location information is requested by the configuration of the advertisement. If requested, then the intermediary sends a request for GPS coordinates to the destination communication device in step 372. In step 374, authorization to release the GPS coordinates is provided by the destination communication device. At step 375, the GPS coordinates are sent to the intermediary. In step 370, the intermediary locates and retrieves an advertisement related to the GPS coordinates using the dynamic content manager.

In an alternate embodiment, the intermediary determines the geographical location of the destination communication device by determining which cellular tower is carrying the signal from the destination communication device.

In step 377, the dynamic content manager of the intermediary determines if the advertisement requires supporting data from outside data sources is required by the advertisement. If so, at step 378, the intermediary requests the supporting data from outside data source 355. At step 380, outside data source 355 configures the supporting data according to parameters included in the request. At step 382, the intermediary retrieves the supporting data from the outside data source.

At step 384, the intermediary configures the advertisement according to data from the parsed header, geographical location and outside data source.

In an alternate embodiment, generation of the advertisement is altered according to a random selection process. The intermediary randomly chooses an advertisement from a predetermined set of advertisements stored in the database of advertiser data 114.

In an alternate embodiment, the intermediary selects which advertisement to send based on the date, time, season of the year, holiday dates, dates of special events or weather related data from outside data source 355. Weather data may be used in association with geographic location data to determine the weather at the geographic location of the destination communication device.

In yet another embodiment, the intermediary selects the advertisement based on previous responses by the destination communication device. Previous responses are drawn from history data 116.

Returning to FIG. 6, at step 266, the advertisement is transmitted to the destination communication device. At step 267, the destination communication device opens and views the advertisement. At step 268, the intermediary records the endorsement click-through event in the history data in association with the subscriber identified in the unique identifier contained in the endorsement tag and when available the GPS coordinates of the destination communication device.

At step 269, the destination communication device activates an embedded link in the advertisement. At step 270, a message is sent to the Intermediary requesting information. At step 271, the intermediary records the request for information and logs the event against the source communication device identifier in a history file. At step 272, the information is provided to the destination communication device. At step 273, the information is viewed.

At step 283, the endorsement manager program periodically triggers an upload of the history log file to the intermediary to be tracked for incentive distribution. In step 284, the history log is uploaded. At step 285, the history log is stored according to the source communication device identification. In step 286, intermediary 9 compiles and tracks incentives.

FIG. 7 is a flowchart showing a method of creating and adding testimonials to communications between the source communication device and the destination communication device. Referring then to FIGS. 2 and 7, at step 310, source communication device 2 interacts with the endorsement manager program to create a testimonial. In the preferred embodiment, the testimonial is a short video file, static picture, text or audio created by and stored on the source communication device.

In an alternate embodiment, the testimonial is a file created on a separate machine and is uploaded to the intermediary. The testimonial file may also contain an active link stored on a separate machine.

The endorsement manager program "associates" the testimonial with an advertisement by appending the endorsement tag related to a participating advertising campaign or advertisement to the testimonial file. In step 314, the source communication device uploads the endorsement tag and the testimonial file to the intermediary. At step 315, testimonial manager 109 functions are started and the testimonial is stored by the intermediary and associated with the advertising campaign or advertisement and the subscriber in the database. In step 316, an actionable link is enabled to allow, viewing of the associated testimonial within the advertisement. At step 317, the testimonial is made available for viewing and editing via the website portal.

At step 322, the source communication device transmits the endorsement tag to the destination communication device. In step 323, the destination communication device opens the endorsement tag. In step 324, a message is sent to the intermediary requesting the advertisement. In step 325, the intermediary records an endorsement click-through event, and uses the dynamic content manager to configure the advertisement for display. In configuring the advertisement for display, an actionable link to the testimonial is included. At step 326, the advertisement is sent to the destination communication device. In step 330, the advertisement is displayed.

In an alternate embodiment, the actionable link may display a list of testimonials associated with the advertisement.

At step 331, the destination communication device selects the link to the testimonial. At step 332, a request is sent to the intermediary for the testimonial. At step 333, the dynamic content manager of the intermediary retrieves the testimonial and configures it for transmission. In step 334, the testimonial is sent to the destination communication device. In step 335, the testimonial is displayed.

At step 340, the destination communication device records a "responsive" testimonial. At step 341, the responsive testimonial is uploaded to the intermediary. At step 344, the intermediary associates the responsive testimonial with the advertising campaign or advertisement and stores it in memory.

FIG. 10 shows incentive administration process. Referring then to FIGS. 2 and 10, in step 767, the intermediary monitors active incentive programs through the functions of incentive manager 111, and if it detects a change in an attribute of an incentive program is scheduled to occur, then at step 768, a message may be sent to the source communication device regarding the change. Examples of changes in attributes include closure of an incentive program or an advertising campaign or temporary special events like a coupon offer.

At step 770, performance data derived from the history log file is analyzed to arrive at an accounting of incentives and fees. At step 775, a report summarizing the incentives and fees due is made available to the advertiser through the website site portal 104. At step 776, the fees due are accessed via the web portal. At step 777, a report is made available to the source communication device regarding incentives through website portal 104. At step 778, the report is accessed via the web portal. At step 785, the intermediary authorizes payment of incentives. In a step 790, payment is made. In the preferred embodiment an electronic cash card is created and sent to the subscriber by mail. In step 795, the financial accounts of the advertisers are appropriately debited by the incentive manager of the intermediary and stored in accounting data 118.

Although various embodiments have been described in detail, those skilled in the art will understand that changes, substitutions and alterations can be made without departing from the spirit and scope of what has been described. Accordingly, all such changes, substitutions and alterations are intended to be included as defined in the following claims.

The invention claimed is:

1. In a system comprising a network, a source communication device, a first destination communication device and an intermediary connected to the network, a method for providing advertising content to a first recipient associated with the first destination communication device and for incentivizing a subscriber associated with the source communication device comprising:

receiving a first profile, at the intermediary, including a set of demographic requirements related to at least one advertiser of a group of advertisers;

receiving a second profile, at the intermediary, including a set of demographic data related to the subscriber;

deriving a match condition, by the intermediary, between the first profile and the second profile;

determining, at the intermediary, if the subscriber is a first qualified subscriber based on the match condition;

conditioning, at the intermediary, a set of endorsement opportunities on the match condition;

transmitting a incentive program to the first qualified subscriber, at the source communication device, for each endorsement opportunity of the set of endorsement opportunities;

communicating the set of endorsement opportunities to the qualified subscriber at the source communication device;

receiving, at the intermediary, a selection of at least one endorsement opportunity from the set of endorsement opportunities from the qualified subscriber;

transmitting, from the intermediary, a first endorsement tag related to the at least one advertiser of the group of advertisers and linked with the advertising content;

transmitting a first content communication between the first source communication device and the first destination communication device;

transmitting the first endorsement tag from the source communication device to the destination communication device;
receiving, at the intermediary, a signal from the destination communication device, through execution of the first endorsement tag, to transmit the advertising content;
transmitting the advertising content to the destination communication device; and,
incentivizing the first qualified subscriber according to the incentive program.

2. The method of claim 1 further comprising the steps of:
creating, at the source communication device, a first testimonial linked to a first testimonial tag;
associating, at the source communication device, the first testimonial with the advertising content;
transmitting the first testimonial tag to the first destination communication device;
receiving, at the intermediary, a request from the first destination communication device, through execution of the first testimonial tag, to transmit the first testimonial; and
transmitting the first testimonial to the first destination communication device.

3. The method of claim 2 wherein the system further includes a second recipient associated with a second destination communication device connected to the network and further comprising the steps of:
receiving a second testimonial, having a second testimonial tag, from the second recipient; and
associating the second testimonial with the advertising content.

4. The method of claim 1 further comprising the steps of:
creating the endorsement tag by combining:
a first identifier associated with the source communication device;
a second identifier associated with the advertising content; and
a third identifier associated with the first content communication.

5. The method of claim 1 wherein the step of transmitting the advertising content includes the further steps:
decoding the endorsement tag, at the intermediary, into the first identifier, the second identifier and the third identifier;
choosing the advertising content, at the intermediary, based on the second identifier; and,
the step of incentivizing includes the further step of:
incentivizing the first qualified subscriber, at the source communication device, based on one or more of the group of, the first identifier, the second identifier and the third identifier.

6. The method of claim 1 wherein the system further comprises a second recipient associated with a second destination communication device connected to the network, and the advertising content including a sign-up tag and the method further comprising the steps of:
transmitting a second content communication between the source communication device and the second destination communication device;
transmitting the endorsement tag from the source communication device to the second destination communication device;
transmitting the advertising content to the second destination communication device;
receiving a signal from the second destination communication device, through the execution of the sign-up tag, indicating a desire by the second recipient to become a second qualified subscriber;
altering a status of the second recipient to become the second qualified subscriber; and,
attributing selection of the at least one endorsement opportunity from the set of endorsement opportunities to the second qualified subscriber.

7. The method of claim 6 wherein the system further comprises a third recipient associated with a third communication device, connected to the network, the method comprising the additional steps of:
providing a second endorsement tag, from the intermediary, related to the at least one advertiser of the group of advertisers and linked with the advertising content;
transmitting a second content communication between the second destination communication device and the third destination communication device;
transmitting the second endorsement tag from the second destination communication device to the third destination communication device;
incentivizing the second qualified subscriber, at the second source communication device, according to the incentive program; and
incentivizing the first qualified subscriber, at the first source communication device, according to the incentive program.

8. The method of claim 7 wherein the step of providing an incentive program comprises the additional step of:
dividing a payment, by the intermediary, between the first qualified subscriber and the second qualified subscriber.

9. The method of claim 1 wherein the advertising content is created by the steps of:
providing, at the intermediary, a base content associated with the at least one advertiser;
modifying the base content, at the intermediary, by addition of a set of data related to one of the group of weather data, geographic data, time data, date data and history data.

10. The method of claim 1 further comprising the steps of:
transmitting, from the intermediary, an auto-matching election from the advertiser; and,
relating the subscriber to a pre-qualified subscriber.

11. The method of claim 1 wherein the step of transmitting an incentive further comprises the step of:
calculating, at the intermediary, a payment dividend between the subscriber and the pre-qualified subscriber.

12. The method of claim 1 further comprising the steps of:
creating a testimonial, at the source communication device;
associating the testimonial, at the source communication device, with the first endorsement tag;
receiving the testimonial and the first endorsement tag at the intermediary;
associating the testimonial, at the intermediary, with the advertising content and the subscriber;
creating, at the intermediary, a link to the testimonial;
transmitting, by the intermediary, the link to the first destination communication device;
activating the link at the first destination communication device; and,
transmitting, from the intermediary, the testimonial to the first destination communication device.

13. The method of claim 12 wherein the step of creating a testimonial further comprises:
the testimonial in a form of one of the group of video, audio, text or picture.

14. The method of claim 1 further comprising the step of:
  conditioning, by the intermediary, the advertisement on a set of data related to one of the group of weather, a geographic location of the source communication device, a geographic location of the destination device, a time, and a date.

\* \* \* \* \*

UNITED STATES PATENT AND TRADEMARK OFFICE
CERTIFICATE OF CORRECTION

| | | |
|---|---|---|
| PATENT NO. | : 8,438,055 B2 | Page 1 of 1 |
| APPLICATION NO. | : 12/803635 | |
| DATED | : May 7, 2013 | |
| INVENTOR(S) | : Levi et al. | |

It is certified that error appears in the above-identified patent and that said Letters Patent is hereby corrected as shown below:

In the Claims:

In Column 15, line 42, after "steps" insert --of--.

Signed and Sealed this
Thirteenth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,438,055 B2  
APPLICATION NO. : 12/803635  
DATED : May 7, 2013  
INVENTOR(S) : Andrew E. Levi et al.

Page 1 of 1

It is certified that error appears in the above-identified patent and that said Letters Patent is hereby corrected as shown below:

On the Title Page

Related U.S. Application Data should read

Item (63) Continuation-in-part of application No. 12/592,019, filed on Nov. 18, 2009, now Pat. No. 8,155,679, which is a continuation-in-part of application No. 11/318,144, filed on Dec. 23, 2005, now Pat. No. 7,664,516.

Item (60) Provisional application No. 60/639,267, filed on Dec. 27, 2004.

Signed and Sealed this  
First Day of April, 2014

Michelle K. Lee  
*Deputy Director of the United States Patent and Trademark Office*